US010536341B2

(12) United States Patent
Clarke et al.

(10) Patent No.: US 10,536,341 B2
(45) Date of Patent: Jan. 14, 2020

(54) FOG-BASED SERVICE FUNCTION CHAINING

(71) Applicant: Cisco Technology, Inc., San Jose, CA (US)

(72) Inventors: Joseph M. Clarke, Raleigh, NC (US); Gonzalo Salgueiro, Raleigh, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 15/446,085

(22) Filed: Mar. 1, 2017

(65) Prior Publication Data

US 2018/0254997 A1 Sep. 6, 2018

(51) Int. Cl.
*G06F 15/173* (2006.01)
*H04L 12/24* (2006.01)
*H04L 29/08* (2006.01)
*H04L 29/06* (2006.01)
*H04L 12/725* (2013.01)

(52) U.S. Cl.
CPC .......... *H04L 41/12* (2013.01); *H04L 41/5019* (2013.01); *H04L 45/306* (2013.01); *H04L 67/12* (2013.01); *H04L 67/32* (2013.01); *H04L 69/22* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS

| | | | |
|---|---|---|---|
| 10,367,623 B2* | 7/2019 | Thubert | H04L 5/0055 |
| 10,382,264 B2* | 8/2019 | Hwang | H04L 41/0816 |
| 2014/0136952 A1 | 5/2014 | Zhu et al. | |
| 2015/0249586 A1* | 9/2015 | Byers | H04L 43/0805 709/224 |
| 2015/0261876 A1 | 9/2015 | Trikha et al. | |
| 2016/0112502 A1 | 4/2016 | Clarke et al. | |
| 2016/0182639 A1 | 6/2016 | Hong et al. | |
| 2018/0159745 A1* | 6/2018 | Byers | H04L 43/08 |
| 2019/0028552 A1* | 1/2019 | Johnson, II | H04L 45/306 |
| 2019/0079788 A1* | 3/2019 | Ruty | G06F 9/445 |
| 2019/0089651 A1* | 3/2019 | Pignataro | H04L 49/3009 |
| 2019/0141119 A1* | 5/2019 | Bernat | H04L 67/1004 |

OTHER PUBLICATIONS

Igor Duarte Cardoso, et al., "Seamless integration of Cloud and Fog networks", Proceedings of the 2015 1st IEEE Conference on Network Softwarization (NetSoft), IEEE Conference Publications, Apr. 13-17, 2015, 9 pages.

* cited by examiner

*Primary Examiner* — Quang N Nguyen
(74) *Attorney, Agent, or Firm* — Edell, Shapiro & Finnan, LLC (57) ABSTRACT

A fog controller is operable to communicate with fog nodes associated with a plurality of special purpose network connected devices. The fog controller receives, from each of a plurality of the fog nodes, an indication of one or more processing capabilities of the respective fog node. Based on the processing capabilities, the fog controller creates a fog-based service function chain that includes a set of the plurality of fog nodes. The fog controller instantiates the fog-based service function chain at the set of the plurality of fog nodes.

20 Claims, 6 Drawing Sheets

FOG-BASED SERVICE FUNCTION CHAINING

TECHNICAL FIELD

The present disclosure relates to fog computing.

BACKGROUND

The Internet of Things (IoT) is a general term used to describe the addition of networking capabilities to physical objects or "things" that serve some purpose or function outside of computing and/or networking technologies (i.e., traditionally "unconnected" or "offline" devices), such as thermometers, refrigerators, lights, wristbands, and sensors. In general, these "things," sometimes referred to as IoT enabled-devices, IoT devices, or special purpose network connected devices, are embedded with electronics, software, and network interfaces, which enable the physical objects to send and/or receive data packets over a network.

The rapid rise of IoT has resulted in steadily increasing numbers and types of IoT devices, as well as an unprecedented volumes and varieties of IoT data. This IoT data is increasingly being processed through the use of so-called fog computing/networking. Fog computing is a type of decentralized computing architecture in which a "fog domain" (fog) is located in physical proximity to the IoT devices, between the IoT devices and a "cloud domain" (cloud). The fog, which is formed by one or more fog nodes, includes processing, compute, storage, and/or other capabilities and, in essence, extends the cloud to the edge of the network, bringing the advantages and power of the cloud closer to where the IoT data is created and acted upon.

DESCRIPTION OF EXAMPLE EMBODIMENTS

Overview

Presented herein are fog-based service function chaining techniques. In an example, a fog controller is operable to communicate with fog nodes associated with a plurality of network connected devices, such as special purpose network connected devices. The fog controller receives, from each of a plurality of the fog nodes, an indication of one or more processing capabilities of the respective fog node. Based on the processing capabilities, the fog controller creates a fog-based service function chain that includes a set of the plurality of fog nodes. The fog controller instantiates the fog-based service function chain at the set of the plurality of fog nodes.

Example Embodiments

As noted, fog computing uses the concept of a fog domain (fog) that is formed by a plurality of fog nodes. The fog nodes extend the associated cloud domain (cloud) to the edge of the network and can be used to process data received from IoT devices. In conventional fog domains, the fog nodes used to process data are generally the IoT device located closest to the IoT device. That is, the fog nodes are selected based on the location of the fog nodes (e.g., proximity to IoT devices), rather than based on efficiency (e.g., processing capabilities of the fog node, time of processing, processing capabilities of other capable fog nodes, etc.). This may lead to multiple fog nodes within the same fog domain performing the same or similar functions. However, if multiple fog nodes are in the same fog domain and each need to process data from a similar set of connected devices, it is inefficient to load that same or similar software on both nodes and/or to have multiple nodes perform the same or similar functions. As the number of IoT devices continues to increase, this type of inefficient fog node processing becomes less and less practical.

In order to eliminate or reduce the duplication of functions within a fog domain, the techniques presented herein define various fog nodes as service nodes within a service function chain. Briefly, a service function chain is a data structure defining a set of service functions (services) and the order in which the service functions should be applied. Therefore, in the examples presented herein, the fog nodes (service nodes) are assigned specific functions, and packets that utilize those functions are forwarded within the fog domain to the fog nodes assigned the respective functions (i.e., data packets are routed to the appropriate fog node for processing). As described further below, the use of service function chains in a fog domain may enable a more efficient distribution of IoT data processing among fog nodes.

Figure 1:
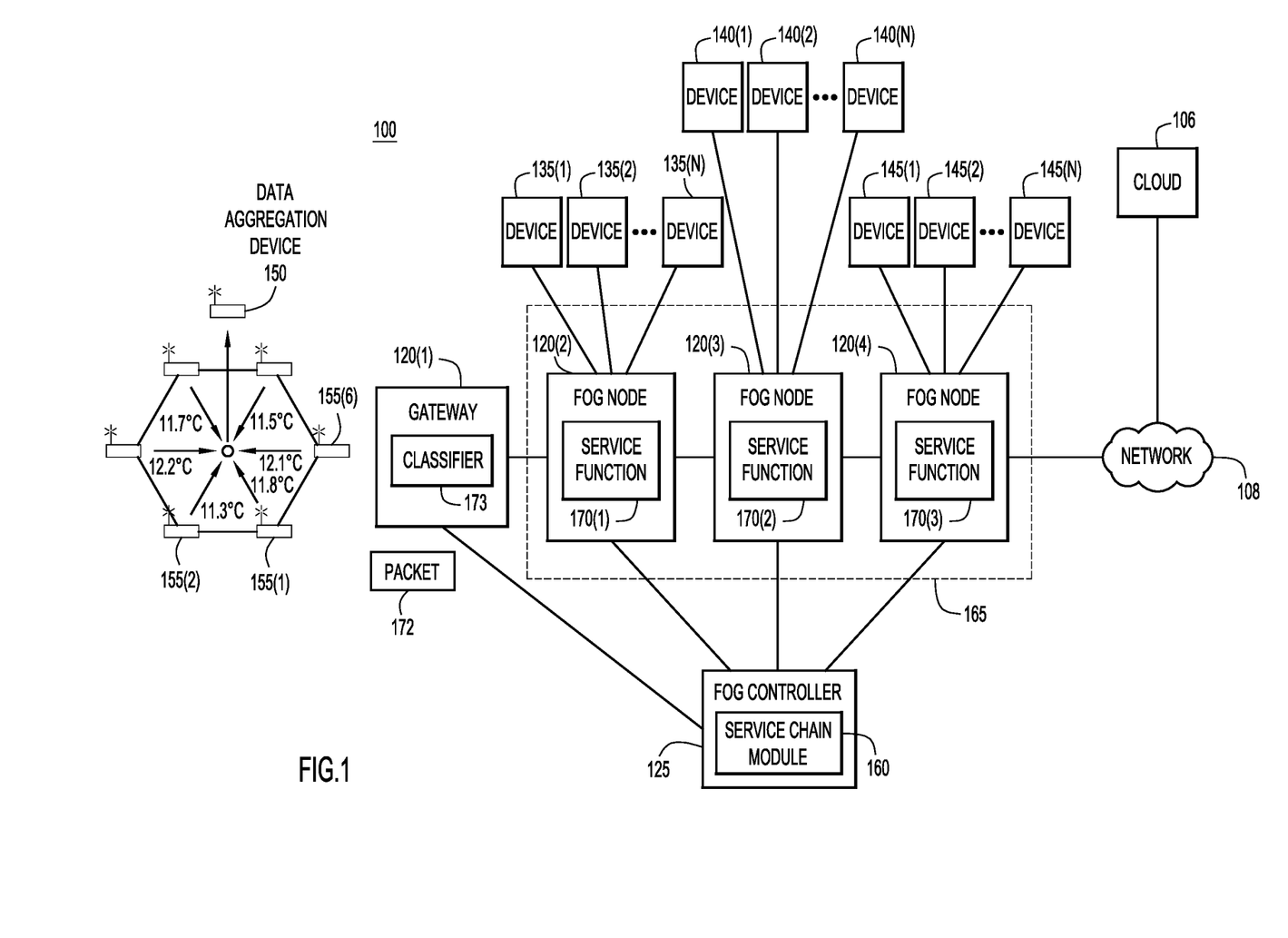
FIG. 1 is a block diagram illustrating a network configured to implement fog-based service function chaining, according to an example embodiment.

FIG. 1 is a block diagram of a network arrangement 100 in which the fog-based service function chaining techniques presented herein may be implemented. The network arrangement 100 comprises a fog computing arrangement ("fog domain" or "fog") 102 that is connected to a cloud computing arrangement ("cloud domain" or "cloud") 106 via a network (e.g., wide area network (WAN)) 108. The fog domain 102 is formed by four (4) fog nodes 120(1)-(4), and a fog controller 125 that is configured to communicate with the fog nodes 120(1)-(4). The fog controller 125 includes a service chain module 160 that, as described further below, enables the fog controller 125 to create (e.g., define) a fog-based service function chain 165 within the fog domain 102 that may be used to process data generated by IoT devices.

As shown, fog nodes 120(2)-(4) are each connected to a plurality of IoT devices, sometimes referred to herein as special purpose network connected devices. In particular, fog node 120(2) is connected to IoT devices 135(1)-135(N), fog node 120(3) is connected to IoT devices 140(1)-140(N), and fog node 120(4) is connected to IoT devices 145(1)-145(N). Fog node 120(1) is configured as a gateway device (gateway) and is connected to a data aggregation device 150, which receives data from IoT devices 155(1)-155(6).

Figure 2:
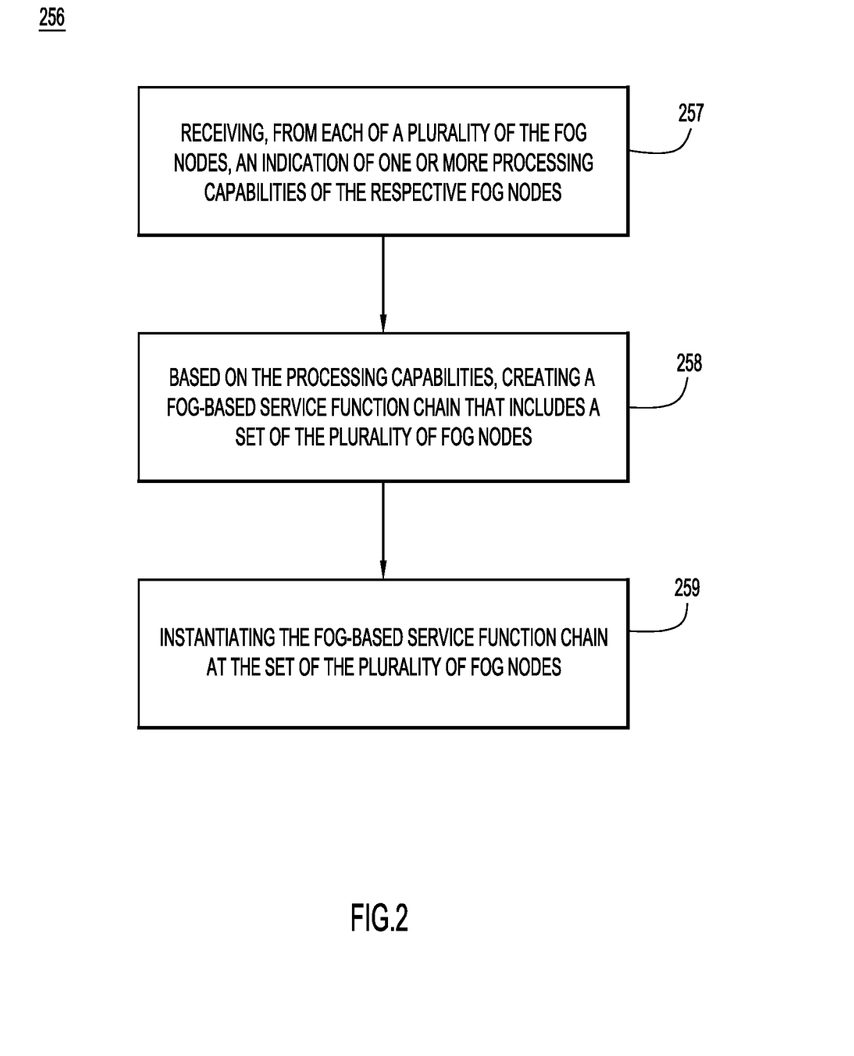
FIG. 2 is a flowchart of a method, according to an example embodiment.

FIG. 2 is a flowchart illustrating a method 256 performed by fog controller 125 in accordance with examples presented herein. More specifically, method 256 begins at 257 where the fog controller 125 receives, from the plurality of fog nodes 120(1)-120(4), information/data representing or indicating one or more processing capabilities of the respective fog node. That is, each fog node 120(1)-(4) registers with the fog controller 125 by sending an indication of its associated processing capabilities to the fog controller 125 (i.e., the fog nodes 120(2)-(4) "register" with the fog controller 125). In one example, the fog controller 125 uses the indications received from the fog nodes 120(1)-120(4) to generate a processing capabilities mapping.

Figure 3:
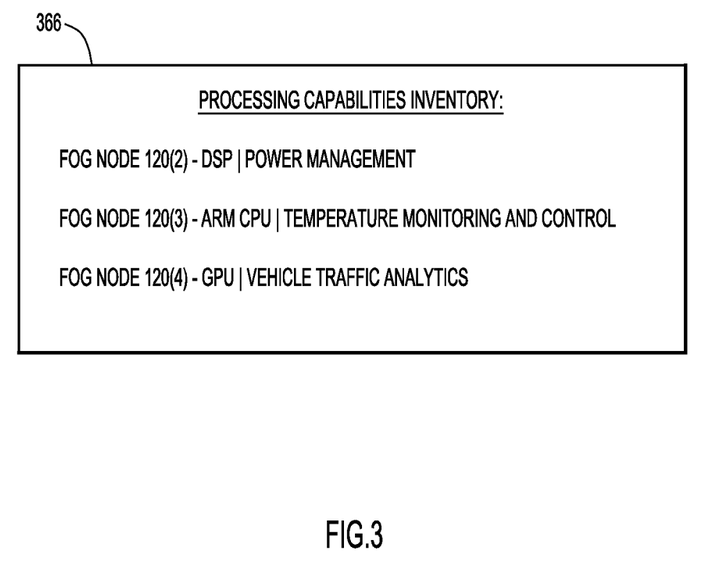
FIG. 3 is a schematic diagram illustrating a processing capabilities inventory that may be used in fog-based service function chains, according to an example embodiment.

FIG. 3 illustrates an example processing capabilities mapping 366 generated by the controller 125 for fog nodes 120(2)-(4). The processing capabilities mapping 366 maps each of the fog nodes 120(2)-(4) to its associated processing capabilities. For instance, fog node 120(2) may include a Digital Signal Processor (DSP) for power management, fog node 120(3) may include an Advanced Reduced Instruction Set Computer (RISC) Machine (ARM) Central Processing Unit (CPU) for temperature monitoring and control, and fog node 120(4) may include a Graphics Processing Unit (GPU) for vehicle traffic analytics. Thus, in certain arrangements, a fog node may include specialized hardware (e.g., field-programmable gate arrays, GPUs, etc.) to enable/aid in certain data processing tasks. One having ordinary skill in the art will understand that these processing capabilities are merely examples and that the techniques presented herein may be used with a number of different types of fog nodes in a variety of arrangements. For example, the techniques presented herein may be used with fog nodes that include similar processing capabilities for different contexts (e.g., ARM CPU for air quality management), fog nodes that include other processing capabilities (e.g., x86 architecture for traffic light control), etc.

FIGS. 1 and 2 illustrate an example in which fog nodes 120(1)-120(4) each provide an indication of one or more processing capabilities of the respective fog node. One skilled in the art will understand that in other examples, a set (e.g., a subset) of the fog nodes may provide indications of their respective processing capabilities and/or the service function chain 165 may include a set (e.g., a subset) of the fog nodes (e.g., the fog controller 125 may create a service function chain that includes only fog nodes 120(2) and 120(3)).

Returning to method 256 of FIG. 2, at 258 the fog controller 125 (e.g., service chain module 160) uses the processing capabilities of the plurality of fog nodes 120(1)-120(4) to create the fog-based service function chain 165. At 259, the fog-based service function chain 165 is instantiated at the respective fog nodes.

In one example, the fog controller 125 creates the fog-based service function chain 165 by assigning a service function to each fog node 120(2)-120(4) (i.e., each of the subset of fog nodes). More specifically, in the example of FIGS. 1 and 2, the fog controller 125 uses the processing capabilities mapping 366 to assign respective service functions 170(1)-170(3) to the fog nodes 120(2)-120(4). In other words, the fog controller 125 auto-programs each of the fog nodes 120(2)-120(4) as, or to include, a corresponding service function 170(1)-170(3).

As noted, the fog-based service function chain 165 is created to include service functions 170(1)-170(3) at the fog nodes 120(2)-120(4). The service functions 170(1)-170(3) may be applied to IoT data in different orders, in different combinations, etc. These different orders, combinations, etc. of the service functions 170(1)-170(3) are referred to herein as different "service paths" through the service chain. As such, the fog controller 125 also creates the fog-based service function chain 165 by defining/creating classifier rules that specify how an incoming data packet is to proceed through the service function chain (e.g., which service path a packet should follow). The classifier rules may be specific to different data types that is to be processed by the fog nodes. In the example of FIGS. 1 and 2, the fog controller 125 may ensure these classifier rules are enforced by instantiating a classifier function (classifier) 173 at the gateway 120(1).

Figure 4:
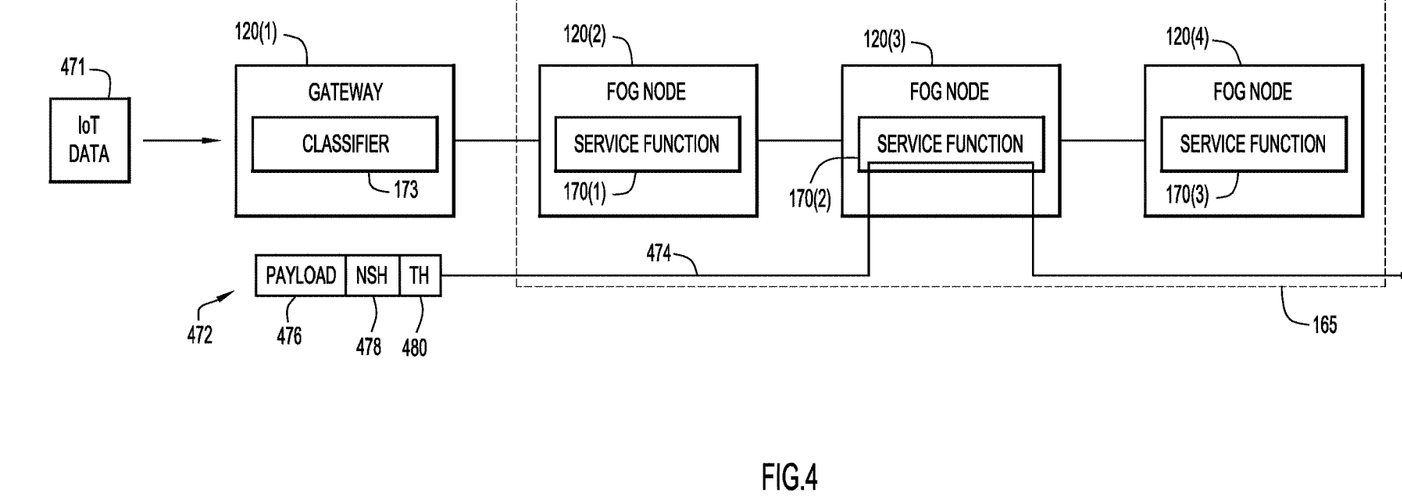
FIG. 4 is a block diagram illustrating an example rendered service path, according to an example embodiment.

FIGS. 1, 2, and 3 generally illustrate the generation of a fog-based service function chain 165 by service controller 125. FIG. 4 generally illustrates the use of the fog-based service function chain 165 for processing IoT data in accordance with examples presented herein.

More specifically, referring first to FIG. 4, shown is a block diagram that includes a portion of the network arrangement 100 of FIG. 1, namely gateway node 120(1) and fog nodes 120(2)-120(4). In this example, the IoT gateway 120(1) receives IoT data 471 to be processed in the fog domain 102 (i.e., for processing by a fog node). The IoT data 471 may be received, for example, from the data aggregation device 150 and may include aggregated data generated by the IoT devices 155(1)-155(N). In other examples, the gateway 120(1) may receive the IoT data directly from one or more IoT devices or from another network node (e.g., router, switch, fog node, etc.).

As noted above, classifier rules (i.e., the classifier 173) are instantiated at the IoT gateway 120(1). The gateway 120(1) is configured to analyze the received IoT data 471 and is configured to use the classifier rules to determine a service path through the fog-based service function chain 165 that is to be used for processing the received IoT data 471. In the example of FIG. 4, the classifier 173 determines that a service path 474, which includes service function 170(2), should be used to process the received IoT data 471. As used herein, the specific service path that is used for processing one or more pieces of IoT data, such as IoT data 471, is referred to as the "rendered" service path for the IoT data.

The IoT data 471 is sent along the rendered service path 474 as part of a service chain packet 472. The service chain packet 472 includes payload 476 that may include the IoT data 471. The payload 476 is encapsulated in a service header 478, which is then encapsulated within a Transport Header (TH) 480. The service header 478 is metadata added to a packet or frame that is used to create a service plane. As explained in greater detail below, the metadata in the service header may be specific to the "fog service" topology. In certain examples, the service header 478 is a Network Service Header (NSH).

The service header 478 is added by the classification function, i.e., the classifier 173 (in the form of a device or application), which, as noted above, determines which packets require servicing, and correspondingly which service path to follow to apply the appropriate service. Also as noted, the payload 476 and the service header 478 are encapsulated in the outer TH 480. The outer TH 480 is used for transport through the service chain.

The service header 478 may be used to indicate which service path the service chain packet 472 should follow. The metadata in the service header 478 may also/alternatively include additional processing information, such as the class of service required for the service chain packet 472, the service level agreement to be applied to the processing task, the incoming protocol (e.g., L2 protocol) details of the IoT device from which the data packet originated, and/or the final encapsulation/format required of the data packet. As such, the NSH enables the fog nodes to communicate with one another and direct the data packet to the appropriate fog nodes for processing. Using a service header 478 to send metadata to fog nodes in the service function chain enables the dynamic provisioning of service function paths based on the processing capabilities of fog nodes.

As noted, the IoT gateway 120(1) transmits the service function chain packet 472 along the assigned rendered service path 474 (e.g., by way of embedded classifier function 173). In particular, because the rendered service path 474 in this example includes only fog node 120(3), the gateway 120(1) transmits the service function chain packet 472 to fog node 120(3), where the IoT data is processed. Thus, fog node 120(3) was determined by the IoT gateway 120(1) (classifier 173) to be the most efficient/capable fog node in the service function chain 165 to process the IoT data.

After processing the data in the data packet 172, fog node 120(3) sends a processed version of the service function chain packet 472, sometimes referred to herein as a processed service function chain packet, to the cloud 106 via network 108 (shown in FIG. 1). In certain examples, the fog node 120(4) (i.e., the last fog node before the cloud 106), gateway 120(1), or another node is used to forward the processed service function chain packet to the cloud 106. The cloud 106, the fog node 120(4), the gateway 120(1), or another node is configured to decapsulate the processed service chain packet.

FIG. 4 illustrates an example in which only IoT gateway 120(1) includes a classifier 173. In another example, a plurality of the fog nodes may each include respective classifiers that perform similar functions as classifier 173. The use of multiple classifiers enables multiple fog nodes to directly handle/process IoT data received from other fog nodes in the service function chain. For example, for a first packet, a first rendered service path may include fog node 120(2), while for a second packet, a second rendered service path may include fog nodes 120(3) and 120(4).

Figure 5:
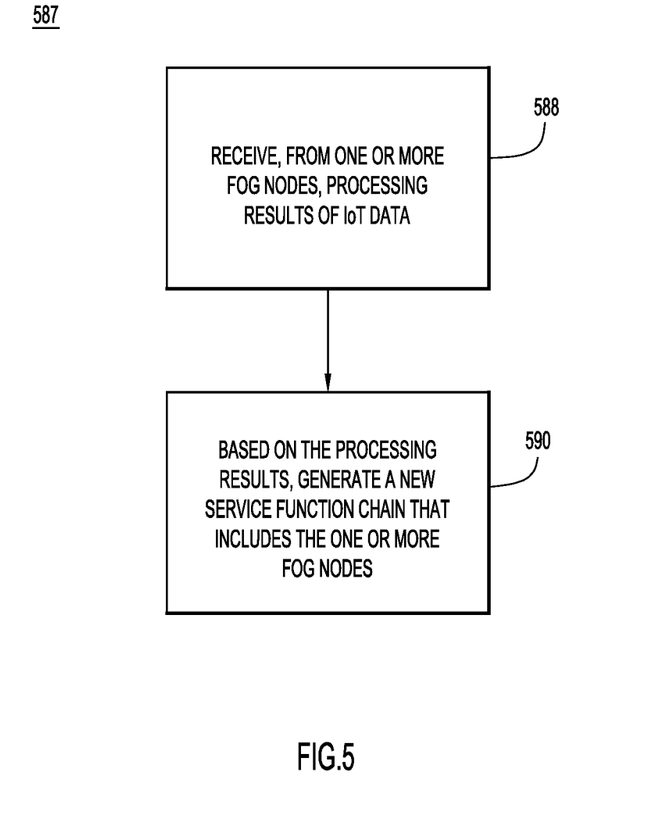
FIG. 5 is a flowchart of a method, according to an example embodiment.

For ease of illustration, FIGS. 1-4 have been described with reference to the generation of a single fog-based service function chain 165. However, it is to be appreciated that the techniques presented herein may be used with multiple service chains that may be generated and instantiated at different times. For example, FIG. 5 is a flowchart of a method 587 for instantiating an additional service function chain in the fog domain 102 of FIG. 1.

Method 587 begins at 588 where the fog controller 125 receives, from one or more of the fog nodes 120(2)-120(4), processing results of IoT device data (e.g., processing results of IoT data 471 from fog node 120(3) in FIG. 4). At 590, the fog controller 125 analyzes the processing results and generates an additional fog-based service function chain. The additional fog-based service function chain may be generated if it is determined that, based on the processing results, certain parameters affect processing time/efficiency. For instance, if the fog controller 125 determines that a certain fog node processes data slowly during a given time of day, then the fog controller 125 may generate an additional service function chain that causes IoT data received during the given time of day to be processed at alternative fog nodes, thereby improving the speed at which the IoT data is processed in the fog domain 102.

In certain examples, the fog controller 125 is configured to use machine-learning techniques to determine whether/which parameters affect the processing results. The flowchart of FIG. 5 may be repeated to enable continuous machine learning. In addition to creation of an additional fog-based service function chain, service function paths in an existing service function chain may also or alternatively be updated dynamically if the availability of a fog node changes (e.g., if a previously unavailable fog node becomes available or if a previously available fog node becomes unavailable). Service function paths may also be dynamically updated if more efficient/responsive/higher-scaling nodes become available.

In the examples presented herein, the fog nodes may also use the service headers to send instructions/parameters for handling IoT data to other fog nodes, IoT gateways (e.g., upstream fog nodes, including a fog node that receives the incoming data packet), etc. For example, a first fog node may signal to a second fog node that a processed result is to be dropped or expressly forwarded. In another example, a first fog node that receives the IoT data may expect to receive additional similar data. In this case, the first fog node may temporarily cache the original data and wait for the additional data so the first fog node may process the original data and the additional data together. If the first fog node does not wish to cache the data locally while it waits for the additional data, it may transmit the data to a second fog node that is to send the additional data to the first fog node. This way, the second fog node may encapsulate the original data and the additional data in a NSH including the appropriate metadata and then transmit all the data at once for processing to the first fog node. Thus, fog nodes in the service function chain may be stateless.

In certain examples, the fog-based service function chains described herein include peer fog nodes (and optionally IoT gateways) disposed within the same fog domain. As noted, these peer fog nodes may act as service functions and handle data from other peer nodes. As such, these service function chains serve at least two purposes, namely: (1) to steer/direct incoming IoT data to the appropriate fog nodes for processing; and (2) to provide channels between/among fog nodes within the service function chain to exchange data. Both of these purposes may be achieved using available metadata fields in the service header (e.g., NSH).

Figure 6:
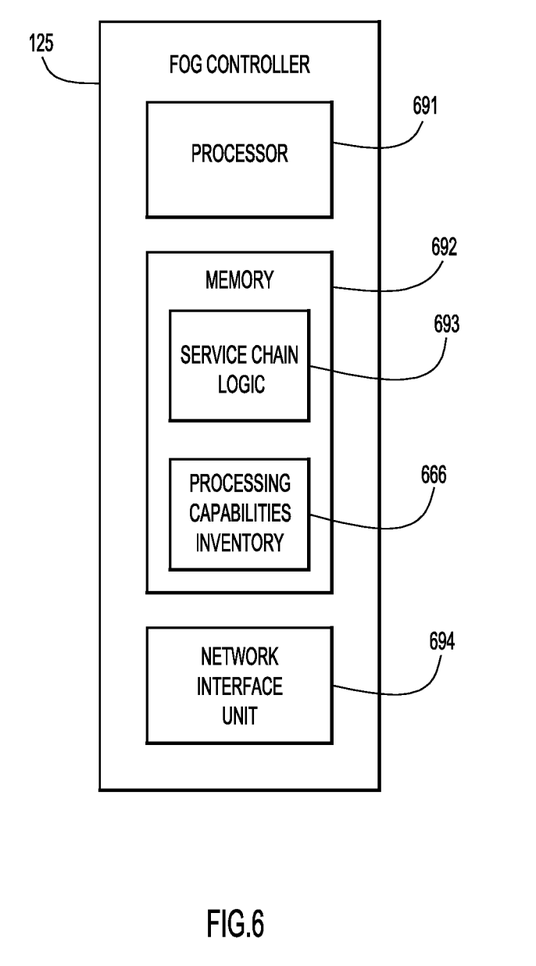
FIG. 6 is a block diagram of a fog controller configured to generate a fog-based service function chain, according to an example embodiment.

FIG. 6 illustrates one arrangement for a fog controller, such as fog controller 125, in accordance with example presented herein. In this example, the fog controller 125 includes one or more processors 691, a memory 692, and a network interface unit 694. The memory 692 comprises service chain logic 693 and a processing capabilities inventory 666. The one or more processors 691 are configured to execute instructions stored in the memory 692 (e.g., service chain logic 693). When executed by the one or more processors 691, the service chain logic 693 enables the fog controller 125 to perform the operations associated with service chain module 160 (FIG. 1). The memory 692 may be read only memory (ROM), random access memory (RAM), magnetic disk storage media devices, optical storage media devices, flash memory devices, electrical, optical, or other physical/tangible memory storage devices. Thus, in general, the memory 692 may comprise one or more tangible (non-transitory) computer readable storage media (e.g., a memory device) encoded with software comprising computer executable instructions and when the software is executed (by the processor 691) it is operable to perform the operations described herein.

Described herein are techniques for enabling fog controllers and fog nodes (e.g., IoT gateways) to orchestrate the processing of IoT data gathered by IoT devices. These techniques are achieved via the generation of a fog-based service function chain that uses the service header to facilitate data exchange between fog nodes. The fog-based service function chaining techniques enable the fog nodes to share application/processing resources (e.g., specialized computing/processing resources) so as to efficiently handle a variety of data streams from different IoT devices. Duplication of applications on fog nodes is reduced, thereby maximizing hardware resources for specialized gateways. Cross-vendor integration of fog nodes and IoT gateways via industry standard protocols may also be achieved. Furthermore, machine learning may optimize the selection of fog node in the fog-based service function chains to ensure that processing time is minimized. Fog node application proliferation is reduced by integrating fog nodes into a service function chain to allow the fog nodes to cooperate in a data exchange.

In one form, a method is provided. The method comprises: at a fog controller operable to communicate with fog nodes associated with a plurality of network connected devices: receiving, from each of a plurality of the fog nodes, an indication of one or more processing capabilities of the respective fog node; based on the processing capabilities, creating a fog-based service function chain that includes a set of the plurality of fog nodes; and instantiating the fog-based service function chain at the set of the plurality of fog nodes.

In another form, a system is provided. The system comprises fog nodes associated with a plurality of network connected devices; and a fog controller associated with the fog nodes. The fog controller is configured to: receive, from each of a plurality of the fog nodes, an indication of one or more processing capabilities of the respective fog node; based on the processing capabilities, create a fog-based service function chain that includes a set of the plurality of fog nodes; and instantiate the fog-based service function chain at the set of the plurality of fog nodes.

One or more non-transitory computer readable storage media encoded with instructions that, when executed by a processor for a fog controller operable to communicate with fog nodes associated with a plurality of network connected devices, cause the processor to: receive, from each of a plurality of the fog nodes, an indication of one or more processing capabilities of the respective fog node; based on the processing capabilities, create a fog-based service function chain that includes a set of the plurality of fog nodes; and instantiate the fog-based service function chain at the set of the plurality of fog nodes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a fog controller operable to communicate with fog nodes associated with a plurality of network connected devices:
      obtaining, from each of a plurality of the fog nodes, an indication of one or more processing capabilities of a respective fog node of the plurality of the fog nodes;
      based on the processing capabilities, creating a fog-based service function chain that includes a set of the plurality of the fog nodes; and
      instantiating the fog-based service function chain at the set of the plurality of the fog nodes.

2. The method of claim 1, wherein creating the fog-based service function chain comprises:
   assigning a service function to each of the fog nodes in the set of the plurality of the fog nodes; and
   creating classifier rules specifying how data generated by at least one of the plurality of network connected devices is to proceed through the fog-based service function chain.

3. The method of claim 2, wherein the fog-based service function chain includes a plurality of service paths, and wherein the classifier rules specify how one of the plurality of service paths are to be selected for processing of the data generated by the at least one of the plurality of network connected devices.

4. The method of claim 3, wherein a first fog node of the set of the plurality of the fog nodes is configured as a classifier node for the fog-based service function chain, and wherein the method further comprises, at the first fog node:
   obtaining the data generated by the at least one of the network connected devices;
   selecting, based on the classifier rules, a rendered service path for processing the data generated by the at least one of the network connected devices; and
   forwarding the data generated by the at least one of the network connected devices along the rendered service path.

5. The method of claim 4, further comprising:
   prior to forwarding the data generated by the at least one of the network connected devices along the rendered service path, encapsulating the data generated by the at least one of the network connected devices in a service header.

6. The method of claim 5, wherein the service header is a Network Service Header (NSH).

7. The method of claim 4, wherein the data generated by the at least one of the network connected devices is processed by one or more fog nodes in the set of the plurality of the fog nodes, and wherein the method further comprises:
   at the fog controller, obtaining processing results from at least one of the one or more fog nodes in the set of the plurality of the fog nodes that processed the data generated by the at least one of the network connected devices.

8. The method of claim 7, further comprising:
   based on the processing results, instantiating an additional fog-based service function chain at another set of the plurality of the fog nodes.

9. A system comprising:
   fog nodes associated with a plurality of network connected devices; and
   a fog controller operable to communicate with the fog nodes and configured to:
      obtain, from each of a plurality of the fog nodes, an indication of one or more processing capabilities of a respective fog node of the plurality of the fog nodes;
      based on the processing capabilities, create a fog-based service function chain that includes a set of the plurality of the fog nodes; and
      instantiate the fog-based service function chain at the set of the plurality of the fog nodes.

10. The system of claim 9, wherein the fog controller is configured to create the fog-based service function chain by:
   assigning, a service function to each of the fog nodes in the set of the plurality of the fog nodes; and
   creating classifier rules specifying how data generated by at least one of the plurality of network connected devices is to proceed through the fog-based service function chain.

11. The system of claim 10, wherein the fog-based service function chain includes a plurality of service paths, and wherein the classifier rules specify how one of the plurality of service paths are to be selected for processing of the data generated by the at least one of the plurality of network connected devices.

12. The system of claim 11, wherein a first fog node of the set of the plurality of the fog nodes is configured as a classifier node for the fog-based service function chain, wherein the first fog node is configured to:
   obtain the data generated by the at least one of the network connected devices;
   select, based on the classifier rules, a rendered service path for processing the data generated by the at least one of the network connected devices; and
   forward the data generated by the at least one of the network connected devices along the rendered service path.

13. The system of claim 12, wherein the first fog node is further configured to, prior to forwarding the data generated by the at least one of the network connected devices along the rendered service path, encapsulate the data generated by the at least one of the network connected devices in a service header.

14. The system of claim 13, wherein the service header is a Network Service Header (NSH).

15. The system of claim 12, wherein the data generated by the at least one of the network connected devices is processed by one or more fog nodes in the set of the plurality of the fog nodes, and wherein the fog controller is further configured to:
   obtain processing results from at least one of the one or more fog nodes in the set of the plurality of the fog nodes that processed the data generated by the at least one of the network connected devices.

16. The system of claim 15, wherein the fog controller is further configured to instantiate an additional fog-based service function chain at another set of the plurality of the fog nodes.

17. One or more non-transitory computer readable storage media encoded with instructions that, when executed by a processor for a fog controller operable to communicate with fog nodes associated with a plurality of network connected devices, cause the processor to:
   obtain, from each of a plurality of the fog nodes, an indication of one or more processing capabilities of a respective fog node of the plurality of the fog nodes;
   based on the processing capabilities, create a fog-based service function chain that includes a set of the plurality of the fog nodes; and
   instantiate the fog-based service function chain at the set of the plurality of the fog nodes.

18. The one or more non-transitory computer readable storage media of claim 17, wherein the instructions cause the processor to create the fog-based service function chain that includes the set of the plurality of the fog nodes by:
   assigning, a service function to each of the fog nodes in the set of the plurality of the fog nodes; and
   creating classifier rules specifying how data generated by at least one of the plurality of network connected devices is to proceed through the fog-based service function chain.

19. The one or more non-transitory computer readable storage media of claim 18, wherein the fog-based service function chain includes a plurality of service paths, and wherein the classifier rules specify how one of the plurality of service paths are to be selected for processing of the data generated by the at least one of the plurality of network connected devices.

20. The one or more non-transitory computer readable storage media of claim 19, wherein a first fog node of the set of the plurality of the fog nodes is configured as a classifier node for the fog-based service function chain, wherein the first fog node is configured to:
   obtain the data generated by the at least one of the network connected devices;
   select, based on the classifier rules, a rendered service path for processing the data generated by the at least one of the network connected devices; and
   forward the data generated by the at least one of the network connected devices along the rendered service path.

* * * * *